United States Patent [19]

Ritzie

[11] 3,974,501

[45] Aug. 10, 1976

[54] DUAL-MODE ADAPTIVE PARAMETER PROCESSOR FOR CONTINUOUS WAVE RADAR RANGING SYSTEMS

[75] Inventor: Andrew David Ritzie, Delran, N.J.

[73] Assignee: RCA Corporation, New York, N.Y.

[22] Filed: Dec. 26, 1974

[21] Appl. No.: 536,559

[52] U.S. Cl. .............................................. 343/14
[51] Int. Cl.² ........................................ G01S 9/24
[58] Field of Search ...................................... 343/14

[56] References Cited
UNITED STATES PATENTS

| | | | |
|---|---|---|---|
| 2,508,400 | 5/1950 | Kiebert, Jr. .......................... | 343/14 |
| 2,866,193 | 12/1958 | Lawton, Jr. ............................ | 343/14 |
| 3,249,938 | 5/1966 | Blitz et al. ............................ | 343/14 |
| 3,403,398 | 9/1968 | Engholm et al. ...................... | 343/14 |
| 3,728,025 | 4/1973 | Madigan et al. ................... | 343/14 X |

Primary Examiner—Malcolm F. Hubler
Attorney, Agent, or Firm—Edward J. Norton; Joseph D. Lazar; Michael A. Lechter

[57] ABSTRACT

An adaptive parameter signal processor for continuous wave radar ranging systems which provides non-quantized measurements of range. Means are provided to select a suitable portion of the difference frequency waveform, excluding any phase reversal. The period of the difference frequency is measured using the selected portion of the waveform and is converted to frequency. The frequency is, in turn, converted to range. The system parameters are automatically adjusted in accordance with the difference frequency waveform. Override means are also disclosed for adjusting the system at a faster rate in response to predetermined conditions such as when an abrupt decrease in range occurs.

6 Claims, 7 Drawing Figures

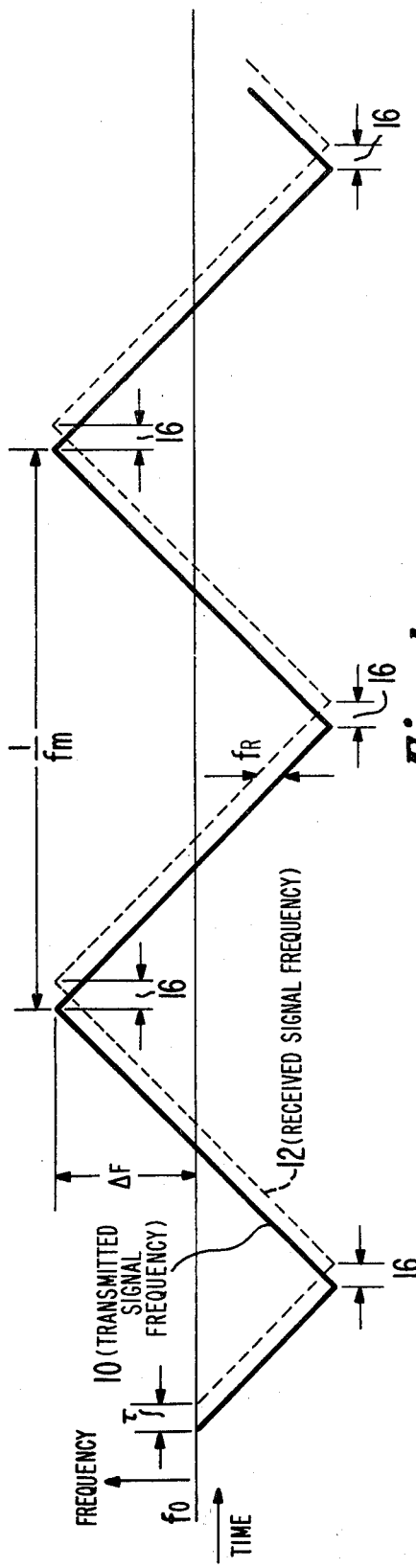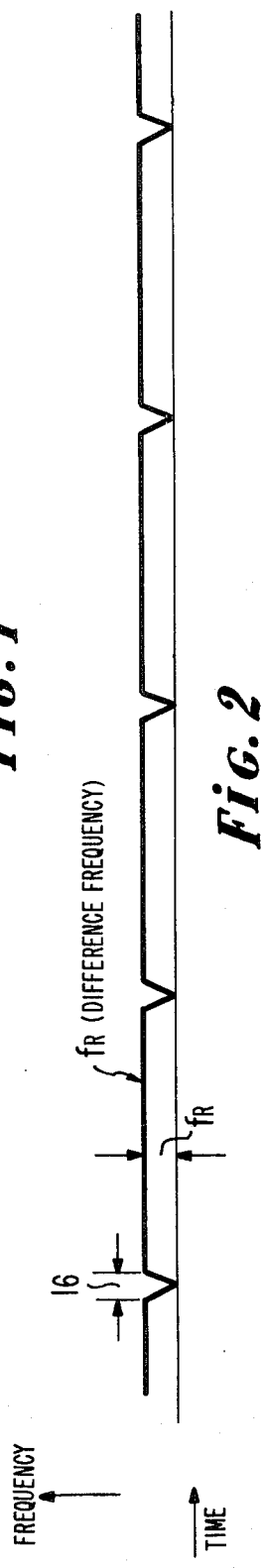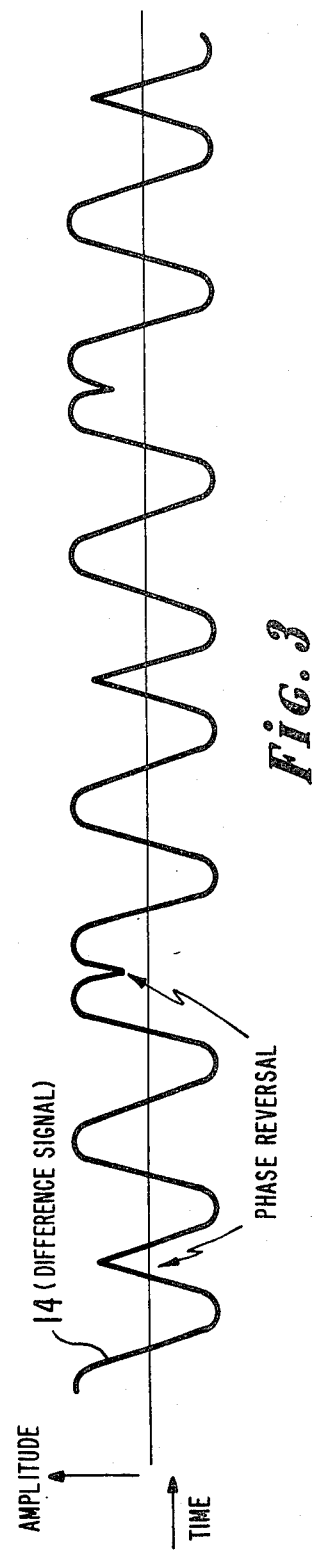

DUAL-MODE ADAPTIVE PARAMETER PROCESSOR FOR CONTINUOUS WAVE RADAR RANGING SYSTEMS

CROSS-REFERENCES TO RELATED APPLICATIONS

Of interest is copending application entitled "Adaptive Parameter Processor for Continuous Wave Radar Ranging System" application Ser. No. 536,558 (RCA 67,379) based on the invention of Gerald S. Kaplan, filed on the same day as and assigned to the same assignee as the present application.

BACKGROUND OF THE INVENTION

1. Field of the Invention

The present invention relates to continuous wave ranging systems and, in particular, to a signal processor for use therein.

2. Description of the Prior Art

In continuous wave (CW) radar ranging systems, a frequency modulated interrogation signal is transmitted toward a target and is reflected therefrom back to the interrogating unit. The reflected signal is received by the interrogating unit and is mixed with a sample of the interrogation signal, and filtered to obtain a difference signal. In a cooperative harmonic system the return signal is a given harmonic of the frequency of the interrogation signal. The reflected signal is therefore mixed with a suitably frequency multiplied sample of the interrogation signal.

The finite distance or range between the interrogating unit and the target introduces a round trip delay $\tau$ between the return signal and the instantaneous interrogation signal sample.

$$\tau = 2R/C \qquad (1)$$

where $R$ is the range and $C$ is the velocity of light. Hence, since the interrogation signal is frequency modulated with a given modulation waveform, the reflected signal as received at the interrogating unit is delayed in time and thus shifted in frequency from the instantaneous interrogation signal by an amount proportional to the range. For example, where a triangular waveform having a peak value of $\Delta F$ and a period of $(1/f_m)$ is used to frequency modulate the interrogation signal, the frequency shift or difference frequency $f_R$, as generated by a suitably filtered mixer, equal to the time derivative of the frequency of the interrogation signal times the round trip time delay, is:

$$f_R = \frac{df}{dt} \cdot \tau = \frac{8\Delta F f_m R}{C} \qquad (2)$$

Thus, the range between the target and the interrogating station may be computed by a measurement of frequency shift $f_R$.

Conventional processors measure the difference frequency by counting the number of zero crossings that occur within a fixed time interval. More specifically, the difference frequency is applied to a counting circuit which develops a signal that is proportional to the rate of zero crossings.

However, the difference frequency waveform is periodic in the frequency $(f_m)$ of the modulation waveform. The average measured frequency as determined by counting zero crossings in a fixed time interval, therefore, must be a multiple of $f_m$. Thus, the measured frequency is quantized and accordingly, so is the range. For the above exemplary triangular modulation waveform, the quantization step in the range, $\Delta R$, is equal to $$\Delta R = \frac{C}{8\Delta f} \qquad (3)$$

Conventional systems provide for minimization of quantization by choosing a maximum frequency deviation $\Delta F$ of the frequency modulation as large as possible. In practice, however, inherent bandwidth limitations on mixing circuits, harmonic generators when applicable as in cooperative harmonic type systems, as well as FCC regulations requiring efficient use of frequency spectrum, place limits on the maximum allowable value for $\Delta F$. Other attempts to minimize quantization of the range measurement have altered the waveform of the difference frequency by superimposing on the modulating signal a slow wobbling of the transmitted frequency. However, such an approach is disadvantageous in that a larger bandwidth is required as compared to non-wobbling systems. Still other attempts to minimize quantization have altered the difference frequency waveform by employing variable phase shifts, either linear such as disclosed in U.S. Pat. No. 2,222,587 to R. C. Sanders, Jr. or non-linear such as disclosed in U.S. Pat. No. 3,340,529 to D. Blitz, on either the transmitted, or returned signal prior to deriving the difference signal.

In contrast, the processor of the instant invention does not alter the difference frequency waveform but instead digitally processes the waveform in such a manner as to allow accurate range measurements to be made without the above described quantization limitation.

SUMMARY OF THE INVENTION

A signal processor, in a continuous wave radar ranging system, wherein a signal modulated in accordance with a given periodic waveform is transmitted in the direction of a target and is reflected from the target back to the source of the transmitted signal. The ranging system includes means for deriving from the transmitted signal and the reflected signal a difference signal indicative of the frequency difference of the reflected signal from the instantaneous frequency of the transmitted signal. The signal processor comprises: blanking means, receptive of signals indicative of the modulation waveform, for generating a train of blanking pulses, in synchronism with the extrema of the modulation waveform, each pulse having a pulse at least as great as the duration of any phase reversal region in the difference signal; and zero crossing detector means, responsive to the blanking pulses and a signal indicative of a variable number and receptive of the difference signal, for generating signals indicative of zero crossings in the difference signal occurring respectively a predetermined number and the variable number of zero crossings after each blanking signal. The variable number is determined from the last range measurement of said target.

The signal processor further comprises accumulator means responsive to the predetermined and variable number zero crossing signals for producing a signal indicative of the cumulative duration of the time periods between the respective occurrence of corresponding predetermined number zero crossing and the variable number zero crossings occurring after each of a second predetermined number of blanking pulses, conversion means, receptive of the duration signal, for deriving from the duration the range of the target and producing a signal indicative of the range; and override condition detector means, responsive to the blanking signals and the predetermined and variable number zero crossing signals, for resetting the accumulator means to zero, decreasing the variable number, and initiating a new determination of the cumulative duration when the variable number of zero crossings after any given blanking signal encompass the next succeeding blanking signal.

DESCRIPTION OF THE DRAWING

FIGS. 1, 2 and 3 are diagrams of waveforms related to the embodiments of the present invention;

DETAILED DESCRIPTION OF THE PREFERRED EMBODIMENT

Figure 4:
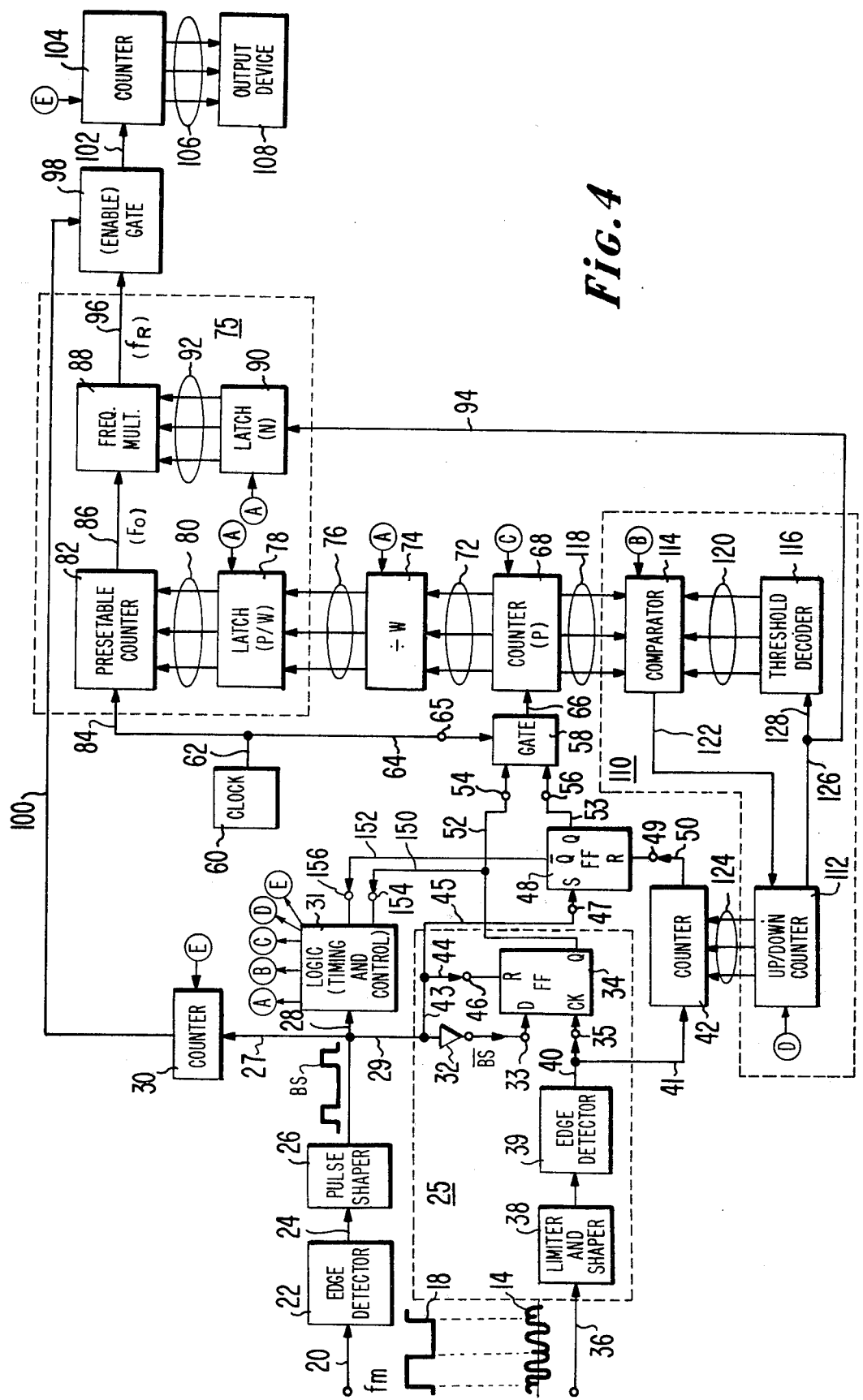
FIG. 4 is a block schematic of a ranging system in accordance with the present invention.

The present invention is directed to a signal processor for use in a continuous wave radar ranging system, which eliminates the quantization error that generally arises in conventional systems and particularly provides for an override mode to adapt the system to abrupt changes in the range to the nearest target.

In continuous wave (CW) radar ranging systems, as indicated above, a frequency modulated interrogation signal is transmitted toward a target and is reflected therefrom back to the interrogating unit. The reflected signal as received at the interrogating unit is delayed in time and hence shifted in frequency from the instantaneous interrogation signal by an amount proportional to the range, in accordance with the round trip delay, $\tau = (2R/C)$, induced by the finite distance arranged between the interrogating unit and the target. Referring to FIGS. 1, 2 and 3 such a phenomenon is shown for an interrogation signal frequency modulated with a triangular waveform having a peak value of $\Delta F$ and a period of $(1/f_m)$.

FIG. 1 shows the frequency versus time plots of the transmitted and return signals, 10 and 12, respectively. The return signal 12 is delayed in time with respect to the transmitted frequency by an amount $\tau$ as previously explained. Consequently, at a given instant in time, the return signal 12 is shifted in frequency from the instantaneous transmitted signal 10 by a difference frequency, $f_R$, equal to the time derivative of the transmitted frequency times $\tau$. Thus, for the particular frequency modulation shown:

$$f_R = \frac{df}{dt} \cdot \tau = \frac{8\Delta F f_m R}{C} \qquad (2)$$

where $\Delta F$ and $f_m$ are the aforementioned known parameters of the modulated transmitted signal 10, $C$ is the velocity of light and $R$ is the range between the interrogating station and the reflecting target. The range, therefore, may be computed from equation (2) by a measurement of the difference frequency $f_R$, suitably generated by mixing the transmitted and received signal.

FIG. 2 shows a typical plot of the difference frequency $f_R$ as a function of time, while FIG. 3 shows the amplitude waveform of such a difference signal. It should be noted that difference frequency $f_R$ is constant, for a given range, except during time periods 16, respectively beginning at each extrema (i.e., the maxima and minima) of the frequency of transmitted signal 10 and terminating at the corresponding extrema of the frequency of the return signal 12. During time periods 16 difference signal 14 undergoes a phase reversal, as illustrated by the waveform of FIG. 3. Thus, the difference signal 14 waveform is periodic at rate $f_m$, $1/f_m$ being the period of the transmitted signal modulation waveform. Consequently, an average measured frequency determined by using waveform 14 and counting all zero crossings that occurs during a sampling period results, in accordance with the prior art, in a frequency $f_R$ which is an integral multiple of $f_m$. It follows, therefore, that the range so determined is quantized in steps of an equivalent amount, $\Delta R$. For a triangular modulation waveform, the equivalent quantization step $\Delta R$ as determined from equation (2), is equal to:

$$\Delta R = C/8\Delta F \qquad (3)$$

For $\Delta F$ equal to a typical value of 25 MHz, such range quantization steps are equal to 1.5 meters, noting that this range is the limit of resolution capability of such prior art systems.

Copending application Ser. No. 536,558 (RCA 67,379) based on the invention of G. S. Kaplan, entitled "Adaptive Parameter Processor for Continuous Wave Radar Systems" provides a method and apparatus for alleviating such quantization error and to improve thereby the resolution of range determination. In general, a sampling frame or measuring period is provided for determination of the difference frequency $f_R$ so as to exclude phase reversal periods 16 and yet include a sufficiently large number of zero-crossings of difference signal 14 to obtain an accurate value for the difference frequency $f_R$ so that the range determined therefrom is a true and not a quantized range. The sampling frame is varied to accommodate changes in the difference frequency caused by changes in the range of the target accommodation, thus being termed "adaptive". The period of the difference frequency $f_R$ is measured during the selected sampling frame and is converted to frequency. The measured frequency, in turn, is converted to range.

The Kaplan processor changes (adapts) system parameters only at the end of a predetermined number of sampling frames over which an average value for the range is derived. (Such operation will hereinafter be termed "normal" mode operation, as will be explained). Thus, when an abrupt decrease in range occurs in the middle of the averaging period, as when, for example, a different target suddenly cuts in front of the interrogating unit, the processor, operating in normal mode, may not adapt quickly enough to the abrupt change in range to provide a timely reaction to the target.

The present invention provides a processor having, in addition to such a normal mode of operation, an override mode, automatically entered into upon the sensing of an abrupt change in range between the interrogating unit and the closest target thereto, wherein the normal mode of operation is inhibited, the system parameters are adjusted and a new range measurement is initiated.

A preferred embodiment of a signal processor in accordance with the present invention may best be described with reference to FIG. 4.

The processor illustrated in FIG. 4 operates in any suitable radar ranging system having, for example, a CW source, a frequency modulator, and a mixer. In such systems, a frequency determining network such as a discriminator or counter is used to determine the frequency change of the reflected signal. According to the present invention, the function of the frequency determining network is performed by the signal processor illustrated in FIG. 4.

A signal 18 indicative of the transmitted signal frequency modulation waveform, suitably a square wave having the same period as the frequency modulation waveform, is applied over a conductor 20 to a suitable edge detector 22. It should be noted that such a square wave 18 is arranged to have transitions corresponding to the extrema (maxima and minima) of the frequency modulation waveform. Edge detector 22 suitably generates an output pulse upon reception of each positive and negative transition in the applied waveform. The output pulses of edge detector 22 are applied over conductor 24 to a suitable pulse shaper 26, which imparts to the pulse a desired pulse width. The shaped pulse, hereinafter referred to as the blanking signal BS, is therefrom applied, over conductors 27, 28 and 29, respectively to counter 30, suitably timing logic 31 and to suitable logic means 25 for detecting the first zero crossing of difference signal 14 occurring after the blanking signal BS. A more detailed description of a preferred arrangement for timing logic 31 will be given in conjunction with FIG. 5. Suitably, in logic means 25, the BS signal is applied through a conventional inverter 32 to the "D" input 33 of a conventional D-type flip-flop 34.

Flip-flop 34 is also receptive of, at its clock input 35, pulses indicative of the zero crossing of difference signal 14. Difference signal 14 is applied over a conductor 36, through a suitable limiter and shaper 38, to a suitable edge detector 39. The output pulses of edge detector 39 are, if necessary, shaped, as by a suitable pulse shaper (not shown), and are applied over conductor 40 to clock input 35 of flip-flop 34.

The output pulses of edge detector 39 are also applied, over conductor 41 to a conventional presettable counter 42. Counter 42 is suitably a presettable up-down counter operating in the downcount mode and is preset with a given number, N, (from counter 112) representative of the number of half-cycles of difference frequency, $f_R$, defining the time frame, as will be explained below.

The blanking signal BS is also taken from conductor 29 via conductor 43 and therefrom via conductors 44 and 45 to the reset (R) input 46 of flip-flop 34 and to the set (S) input terminal 47 of a conventional RS type flip-flop 48. The reset terminal 49 of flip-flop 48 is receptive of the output signals of counter 42 over conductor 50. The respective Q output signals of flip-flops 34 and 48 are applied over conductors 52 and 53 to the input terminals 54 and 56 of a suitable logic gate 58, in the preferred embodiment, a conventional three input AND gate.

The Q output signal of D flip-flop 34 is also applied over conductor 150 to input terminal 154 of timing logic 31. Another input terminal 156 of timing logic 31 is receptive of the $\bar{Q}$ output signal of RS flip-flop 48 via conductor 152.

Logic gate 58 receives as input signals, in addition to the Q output signals from flip-flops 34 and 48, clock pulses from a conventional high frequency clock $(f)$ 60, from clock 60 over conductors 62 and 64 to the input terminal 65. Logic gate 58, when enabled, serves to apply the clock pulses over a conductor 66 to a conventional counter 68, serving as a period (P) counter. Period counter 68 is also receptive of control signals from timing logic 31 (conductors not shown), as will be explained. In accordance with the control commands from timing logic 31, the contents of period counter 68 are applied in parallel over conductors 72 through a suitable divider serving as a prescaler 74, to means, generally indicated as block 75, for reconstructing the difference frequency $f_R$. Specifically, upon command from timing logic 31 the output signals from prescaler 74 are transmitted over conductors 76 to a conventional latch (temporary storage register) 78. The contents of latch 78 are, non-destructively applied over conductors 80 to a suitable frequency divider, such as a presettable counter 82. Counter 82 is also receptive of clock signals from clock 60, over conductors 62 and 84 to generate output pulses at a frequency $F_0$ equal to the frequency of the clock pulses $(f)$ divided by the contents of latch 78. The output signal at $F_0$ is applied over conductor 86 to a suitable frequency multiplier 88. Frequency multiplier 88 is also receptive of the contents of a conventional latch 90, the contents of latch 90 being applied, upon command, to multiplier 88 over conductors 92. The contents of latch 90 loaded therein over conductor 94 are equal to the given number N, as will be explained. The output signals $(f_R)$ from frequency multiplier 88 are applied over conductor 96 to a suitable logic gate 98, which is enabled by signals received over conductor 100 from counter 30. The output signals from gate 98 are applied over conductor 102 to a suitable counter 104, the counter of which is applied over conductors 106 to a suitable output device 108 such as an indicator of range or a switch responsive to a predetermined range for automatic braking.

As previously noted, counter 42 is preset with a given number N representative of the number of half cycles of the difference frequency $f_R$ defining the sampling frame. This is suitably accomplished by a feedback apparatus, generally indicated as 110, comprising conventional up/down counter 112, a suitable comparator 114 and a suitable threshold decoder 116. Comparator 114 receives as input signals, over conductors 118, the contents of period counter 68 and is also receptive of, over conductors 120, the output signals from threshold decoder 116. The contents of up/down counter 112 are representative of the instantaneous value of N and are incremented or decremented, if necessary, in accordance with signals received from comparator 114 over conductor 122 or in accordance with signals received from timing logic 31 (conductors not shown) during the override mode of operation, as will be explained. Up/down counter 112, upon command from timing logic 31, loads in parallel, counter 42 with the contents of up/down counter 112 over conductors 124. Up/down counter 112 also applies signals indicative of its contents, N, over conductor 126 and therefrom over conductor 128 to threshold decoder 116 and over conductor 94, as previously mentioned, to latch 90.

Figure 5:
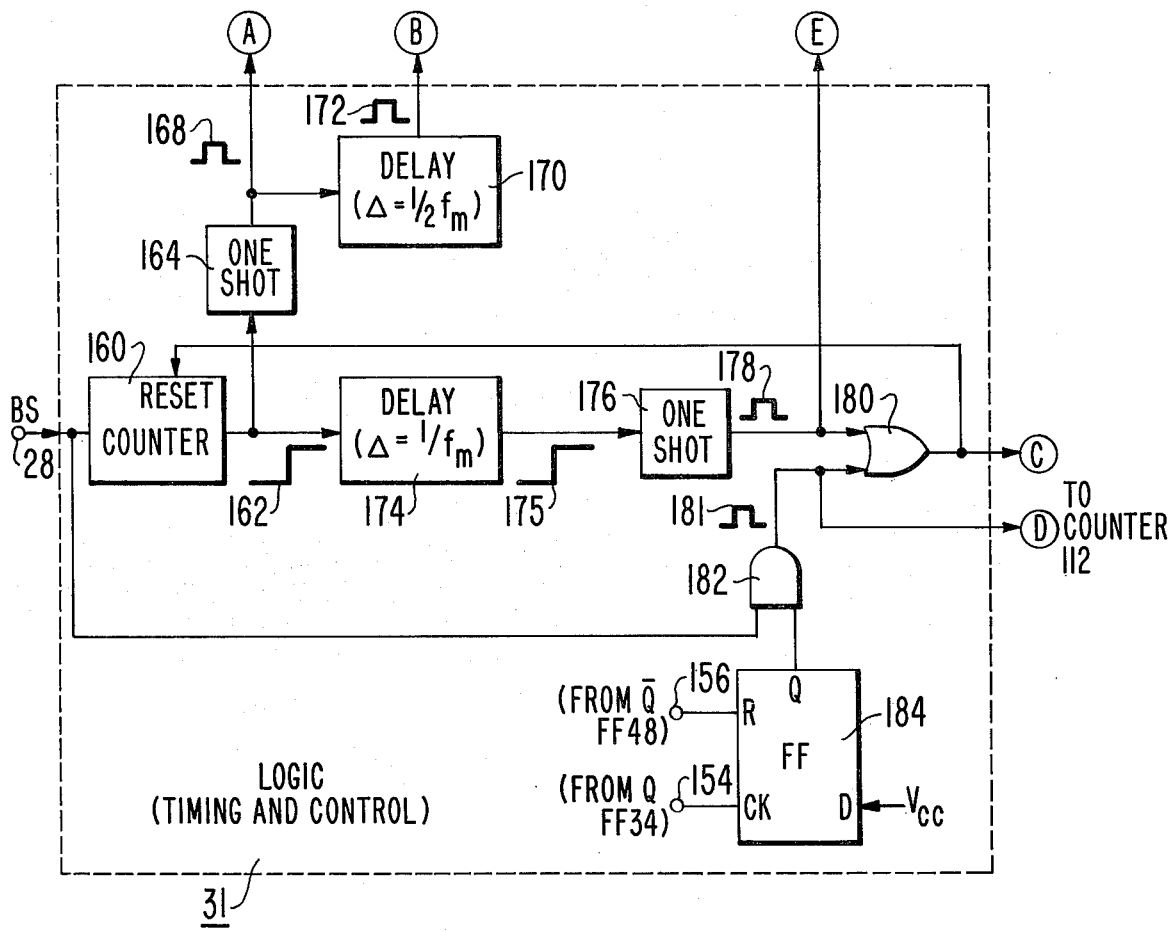
FIG. 5 is a more detailed block schematic of timing logic 31.

A more detailed description of timing logic 31 is now given with reference to FIG. 5, a detailed schematic of the block of logic 31 in FIG. 4. The blanking signal BS, on conductor 28, is applied to a conventional counter 160. Counter 160 generates an output signal 162, having a positive going transition at a count of 2W blanking signals. Typically, 2W equals 256, but for the present description 2W will be assigned the value of 4 to simplify the presentation. Counter output signal 162 is applied to a conventional one shot 164. One shot 164 fires in response to positive going transitions in counter output signal 162, and produces a control pulse 168 suitably having similar amplitude and duration to the blanking signals BS. Control pulse 168 is applied to a suitable delay 170. Delay 170 produces an output pulse 172 equivalent to pulse 168 but suitably delayed by a period equal to one half the period of the transmitted signal modulation waveform 10, $\frac{1}{2}f_m$, that is, the period between two blanking signals.

Figure 6:
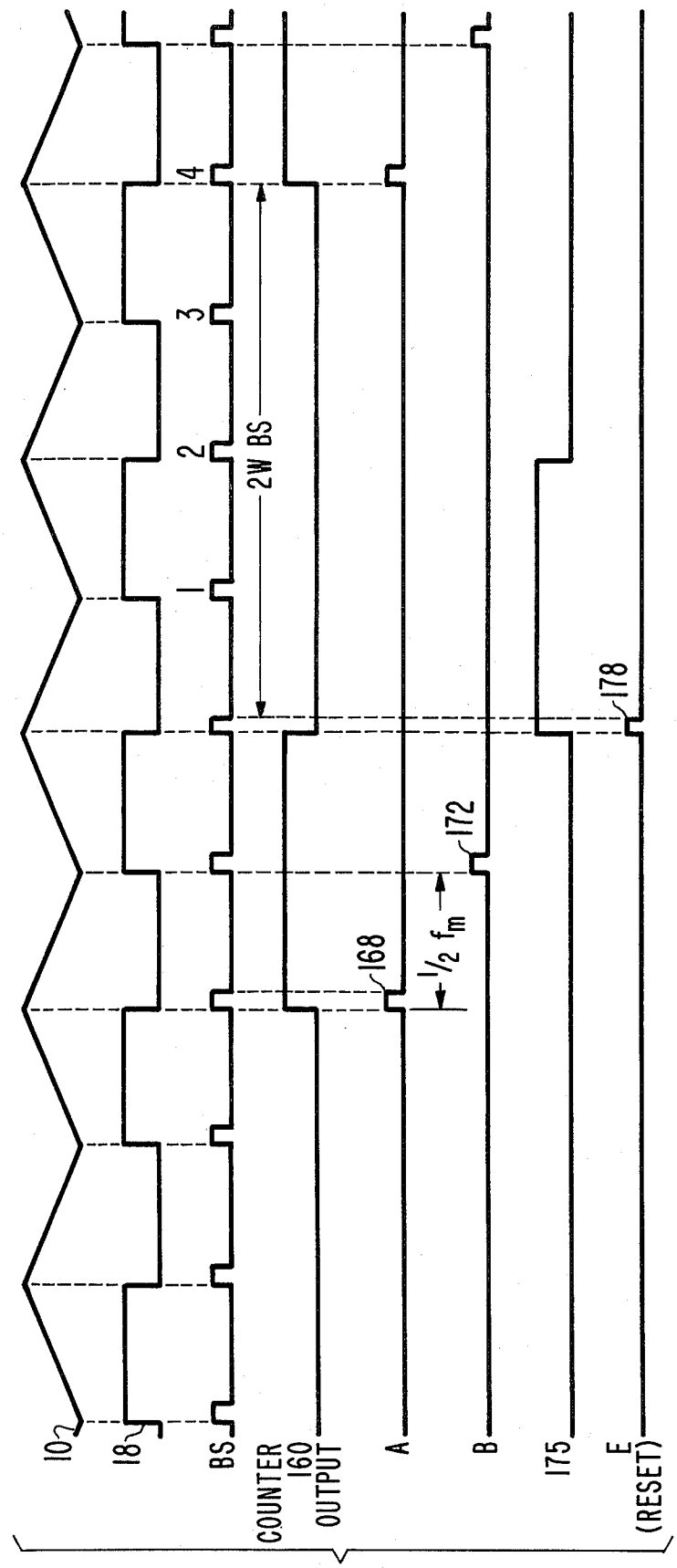
FIG. 6 is a suitable timing diagram of the timing signals produced by timing logic 31.

Counter output signal 162 is also applied to a second suitable delay 174. Delay 174 generates an output signal 175 which is equivalent to the counter output signal 162 suitably delayed by the period of one cycle of the transmitted signal modulation waveform 10, $1/f_m$, that is, the period defined by three consecutive leading edges of blanking signals. Delayed signal 175 is applied to a conventional one shot 176, which fires in response to positive going transitions in signal 175, and generates a reset pulse 178. Reset pulse 178 is suitably of similar amplitude and duration as blanking signal BS. A typical timing relationship of timing pulses 168, 172 and 178 with respect to each other and various other signals utilized in the system of FIG. 4 is shown in FIG. 6, to be described in conjunction with a detailed description of the operation of the system hereafter.

It should be apparent to those skilled in the art, that the above described means of implementing timing logic 31 is only one of many possible implementations which will produce pulses 168, 172 and 178 in timed relation and that any manner of producing such pulses may be utilized to implement the present invention.

Reset pulse 178 is applied to conventional two input OR gate 180, the other input of which being connected to the output of a conventional two input AND gate 182 are respectively the BS signals and the Q output of a conventional D type flip-flop 184. The reset input R of flip-flop 184 is connected to terminal 156 of timing logic 31 and thus is receptive of the $\overline{Q}$ output signal from flip-flop 48. The clock input terminal (ck) of flip-flop 184 is connected to input terminal 154 of timing logic 31, and is thus receptive of the Q output of flip-flop 34 (FIG. 4). The data terminal D of flip-flop 184 is tied high, i.e., connected to a plus voltage source.

Before proceeding to a more detailed description of operation, of the system, the overall operation of the system illustrated in FIG. 4 is generally as follows. An adaptive sampling frame is provided by initiating a count at the known clock frequency f in counter 68, by enabling gate 58, upon the first zero crossing of difference signal 14 occurring after a blanking signal (BS) and terminating the count by inhibiting gate 58, after a specified number, N, of zero crossings (half cycles) of the difference signal 14. The number of half cycles, N, in the sampling frame must be large enough to ensure an accurate measurement, but not so large as to extend the duration of sampling frame beyond the next blanking signal and hence into the "forbidden" phase reversal region. Since the difference frequency ($f_R$) is a function of the range of the target, the cumulative duration of N half cycles also varies with the range. Hence, in order to maintain a proper sampling frame according to the present invention, the number of half cycles defining the sampling frame must be made to adapt to changes in the range of the target. N is therefore, an adaptive parameter determined by the last range measurement of the target. Thus, at the end of the sampling frame, the contents of counter 68 are indicative of the cumulative period of N half cycles of the difference frequency $f_R$.

In order to ensure a more accurate period measurement, the normal operation mode repeats the above described process a predetermined number 2W, times (here 4), and accordingly divides the accumulated count to obtain an average over the total sampling period. If, however, during a given sampling frame, an abrupt change in the range to the closest target is sensed, the system enters an override mode of operation. The value of N is decreased by a given number, suitably one, the period measuring portion of the system is reset and a new average count (period) determination is initiated. The process is repeated each sampling frame thereafter until an appropriate value for N is found. After an appropriate value for N is determined, a new normal mode operation period measurement is initiated and a new average count derived.

After the average count has been derived, the average count and the value of N are loaded into temporary storage, i.e. latches 78 and 90 respectively, feedback means 110 samples the accumulated count and accordingly adjusts the value of N to changes in the range of the target, as will be explained, and the period measuring portion of the system is reset, all in accordance with control signals provided by timing logic 31, (to be explained in more detail in conjunction with FIG. 6). The above described period measurement is repeated, while the stored average count and N from the previous measurement are utilized to construct a signal with no phase inversions at the difference frequency. The constructed signal ($f_R$) is, in turn, converted into a representation of range.

A more specific description of the operation of the system is now given with reference to FIGS. 4, 5, 6 and 7. Edge detector 22 and pulse shaper 26 serve to generate a pulse train of blanking signals BS, the blanking signals comprising pulses of a specified width occurring at the extrema of the modulation waveform. As noted above, the phase reversals of the difference signal 14 occur during the time period 16 (FIG. 1) between corresponding extrema of the frequency modulation of the transmitted (10) and return (12) signals. As previously noted, edge detector 22 generates pulses at the times of the extrema of the transmitted signal modulation waveform 10. Thus, by setting pulse shaper 26 to an appropriate pulse width, the blanking signal pulses occur simultaneously with and encompass the phase reversals of the difference signal 14. In practice, the time periods 16 are narrow compared with the period of a typical difference frequency $f_R$.

To exclude the phase reversal regions 16 of the difference signal 14, each sampling frame is therefore made to begin after a respective blanking signal BS and end before the occurrence of the next blanking signal BS. Accordingly, detector means 25 detects the first zero crossing of difference signal 14 occurring after blanking signal (BS) thereupon generating a suitable output signal to enable gate 58. Limiter and shaper 38 and edge detector 39 serve to detect zero crossings in the difference signal 14. The blanking signal BS is utilized to initially reset flip-flop 34 and set flip-flop 48. The complement, $\overline{BS}$, of the blanking signal BS, as generated by inverter 32, and is applied to the D input of flip-flop 34, goes high at the end of the blanking signal BS. The first zero crossing of difference signal 14 thereafter detected, operates to clock flip-flop 34, causing its Q output to go high. As previously noted, in the preferred embodiment of the invention, logic gate 58 is a three input AND gate, receptive of, at its input terminals, the Q output of flip-flop 34, the Q output of flip-flop 48 and clock signals from clock 60. RS flip-flop 48, having been previously set by the blanking signal BS, provides a high level input signal to AND gate 58. Thus, when the occurrence of the first zero crossing of difference signal 14 after the blanking signal causes flip-flop 34 to generate a high level signal, gate 58 is enabled with respect to the clock signals and incrementation of counter 68 at the clock rate is accordingly initiated.

It should be appreciated by those skilled in the art, that while starting the sampling frame upon the first zero crossing after a blanking signal is advantageous in that it provides for an optimumly long sampling frame, the frame may be initiated on any given zero crossing occurring after the blanking signal.

As previously noted, the sampling frame has a duration of N half cycles of the difference frequency 14, where N is an adaptive parameter determined from the last known range of the target. Accordingly, the blanking signal BS suitably causes counter 42 to be preset with the instantaneous value of N contained in up/-down counter 112. $\overline{BS}$ suitably operates to enter counter 42 into a count down mode. Thus, at the end of N half cycles (zero crossings) after the end of a blanking signal, counter 42 generates an output signal which resets flip-flop 48, causing the Q output thereof to go low, and thereby inhibiting gate 58. Thus, period counter 68 is incremented in accordance with high frequency (f) clock signals received during a sampling frame comprising the N half-cycles of the difference frequency first occurring after the end of a blanking signal pulse. The contents of P counter 68, at the end of the first sampling frame are therefore indicative of the cumulative period of N half cycles of the difference frequency $f_R$. Specifically, the contents of counter 68 are equal to the preset number N times the frequency of the clock 60, $f$, times one half period for a cycle of the difference frequency, $\frac{1}{2}f_R$, that is, $$P = \frac{Nf}{2f_R} \qquad (4)$$

As previously noted, in normal mode operation the above-described process is repeated after the next blanking signal pulse and continues for a predetermined number, 2W, of blanking pulses under control of timing logic 31 to determine a more accurate average period for $f_R$.

Figure 7:
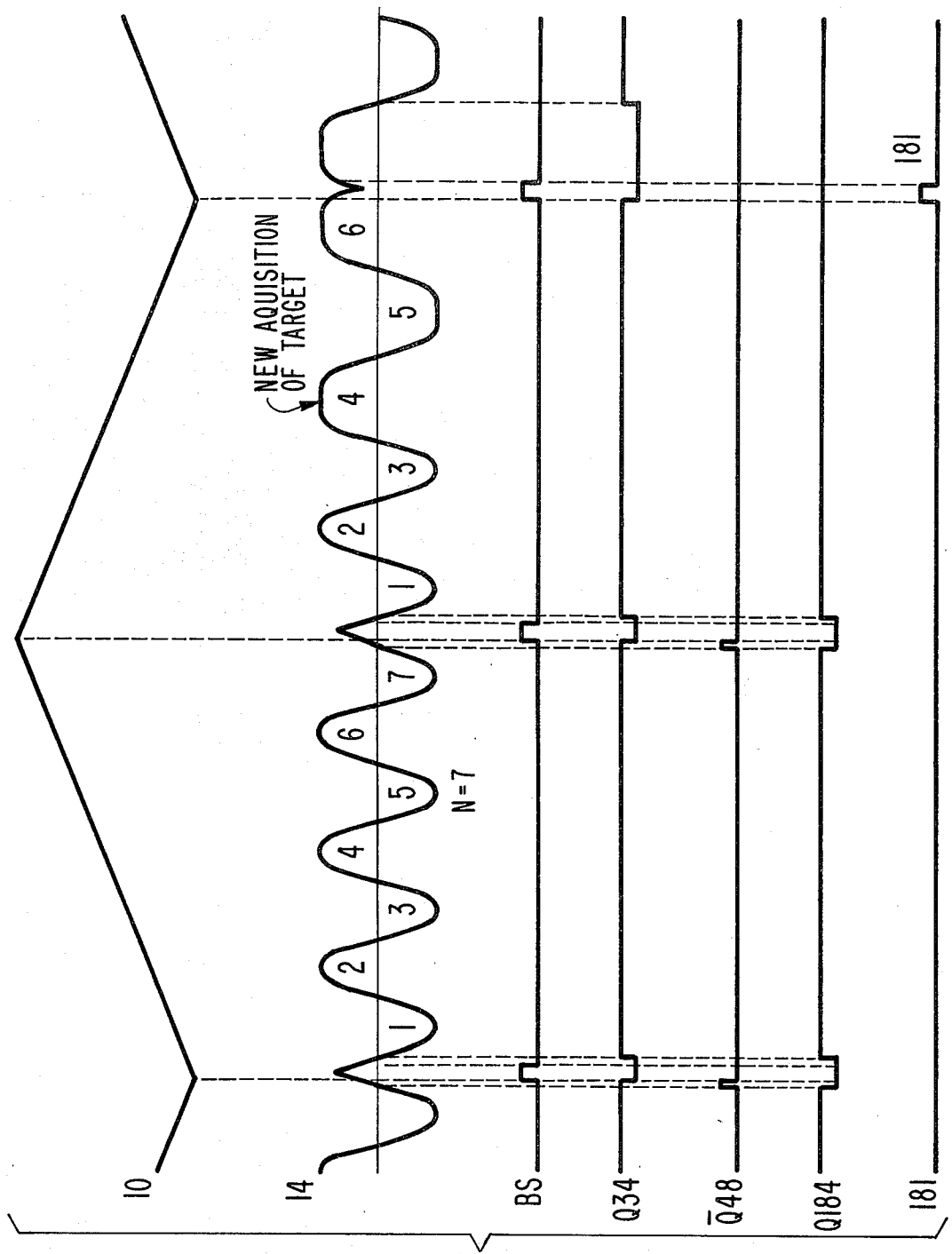
FIG. 7 is a timing diagram of the signals involved with the initiation of an override mode of operation.

However, where an abrupt decrease in range between the interrogating station and the nearest target occurs, as when, for example, a different target cuts in front of the interrogating vehicle, the difference frequency $f_R$ will accordingly decrease. Hence, the accumulative period of N half cycles of $f_R$ may be greater than the period between two blanking signals and would include the forbidden phase reversal region of difference signal 14. Such an occurrence is illustrated in FIG. 7 with an exemplary initial value for N of 7. In accordance with the present invention, the system is adapted to such a condition by sensing when N half cycles of $f_R$ after a given blanking signal encompass the next succeeding blanking signal. Normal mode operation is inhibited and override mode operation is initiated.

D type flip-flop 184 senses the override condition. If not otherwise inhibited by a positive voltage level at its reset terminal, the Q output of D flip-flop 184 assumes the state of the signal applied to the data input, D, (high) in response to positive going transitions applied to the clock input, ck. FIG. 7 illustrates the relative timing, of the input and output signals of flip-flop 184, described above, reset pulse 181, transmission modulation waveform 10, difference signal 14 and blanking signals BS. As previously explained, a positive transition in the Q output of D type flip-flop 34, the clock input to flip-flop 184, occurs upon the first zero crossing of the difference signal 14 detected after the end of a blanking signal BS. RS flip-flop 48 is set by blanking signals BS. The $\overline{Q}$ output of flip-flop 48, the reset input to flip-flop 184, accordingly goes low. RS flip-flop 48 is subsequently reset by the Nth zero crossing of difference signal 14 occurring thereafter, and its $\overline{Q}$ output accordingly goes high. The Q output of flip-flop 184 is thereby driven low. As illustrated in FIG. 7, AND gate 182 is therefore enabled only with respect to the first blanking signal that would be included within N zero crossings of $f_R$ from the immediately preceeding blanking signal, to thus produce a reset pulse 181.

Pulse 181 suitably is applied to up/down counter 112, causing it to decrease its contents, N, by a given number, suitably one. Pulse 181 is also utilized to reset period counter 68, counter 160 in timing logic 31. Thus, a new period measurement is initiated upon the next succeeding blanking signal BS. If the decrease in N was not sufficient to adapt the system to the range of the closest target, flip-flop 184 detects the deficiency in the next sampling frame and repeats the above described operation. If the decrease in N is found sufficient in the next sampling frame, however, the system assumes normal mode operation, utilizing that sampling frame as the first of 2W sampling frames to determine a new average count.

After a count has accumulated in counter 68 for 2W sampling frames, timing logic 31 generates appropriate control pulses 168, 172 and 178 in timed relation, a suitable relation being illustrated in FIG. 6. The operations effected by such control pulses are now described with reference to FIGS. 4, 5 and 6. In response to pulse 168, the cumulative count in counter 68 is divided by W and the resultant average count is loaded into latch 78. Pulse 168 also causes the value of N to be loaded into latch 90. Pulse 172 from timing logic 31, then causes feedback apparatus 110 to sample the cumulative count in counter 68 and to adjust the contents (N) of up down counter 112 accordingly. Reset pulse 178 subsequently resets counters 68, 104 and 160 to zero for the next period measurement and initiates a frequency conversion of the old measurement as will be explained. More specifically at the end of 2W sampling frames, the cumulative contents (P) of counter 68 are equal to $$P = \frac{WNf}{f_R} \qquad (5)$$

The cumulative count is therefore divided by W to obtain the average cumulative count (P/W) over a period of N cycles of the difference frequency $f_R$.

The average count is utilized to construct a signal at the difference frequency $f_R$. The average count and the value of N utilized for the period measurement are respectively loaded into latches 78 and 90, as previously described. Upon command, from presettable counter 82, the average count in latch 78 is loaded into the counter 82. Counter 82 continually cycles between operation in a load mode, wherein it is loaded with the contents of latch 78 and a down count mode wherein the counter 82 is clocked at the frequency of clock 60 and generates one, output pulse ($F_0$) for every P/W clock pulses. The presettable counter 82, thus, in effect, divides the clock frequency ($f$) by the average count and generates a pulse train at frequency $F_0$ equal to the difference frequency divided by N. That is, $$F_0 = \frac{f}{P/W} = \frac{f_R}{N} \qquad (6)$$

As previously mentioned, the signal at frequency $F_0$ is applied to frequency multiplier 88, which serves to generate N output pulses for each input pulse received. Frequency multiplier 88 therefore generates an output signal at the difference frequency $f_R$.

It should be noted and appreciated that the use of the same pulse train both to accumulate the period count in counter 68 and to convert the measured period to a frequency is particularly advantageous in that the continuous compensation for any drift or variation in the clock frequency is thereby provided.

It should further be noted and appreciated that a difference frequency signal (pulse train) having continuous transitions between ranges may be constructed by loading new values for average period into latch 90 synchronously with $F_0$.

After the average period and N have been stored in latches 78 and 90, timing pulse 172, causes feedback means 110 to determine in effect whether the last used value for N is appropriate for the latest determination of range and accordingly increments or decrements the value of N to be used in the next period measurement as necessary. The contents of counter 68, it is noted, are proportional to the average sampling time, which, in turn, varies with the range. Comparator 114, in response to timing pulse 172 samples the cumulative count in counter 68 and compares the cumulative count (P) with maximum and minimum threshold values, $P_{max}$ and $P_{min}$. The threshold values are determined by threshold decoder 116 from the instantaneous value of N contained in up down counter 112 and are transmitted therefrom to comparator 114. Comparator 114 generates a control signal indicative of the results of the comparison, which is applied to up/down counter 112 to accordingly increment or decrement, if necessary the instantaneous value of N.

It is desirable to make the maximum and minimum thresholds vary with given ranges of the difference frequency. The time of the first zero crossing of difference signal 14 may vary by up to one-half cycle of difference frequency ($f_R$). Since the difference frequency may vary over a wide range, a safety margin that is adequate for lower frequencies is excessive for higher frequencies and the sampling frame would thereby disregard valid information. Noting that N is proportional to the difference frequency $f_R$, threshold decoder 116 for this reason, receives signals indicative of the new N and, in effect, decodes the value of N to determine appropriate threshold values for the next period measurement. Threshold decoder 116 is accordingly a suitable arrangement of logic elements, as well known in the art, which generates one of a plurality of sets of output signals, in accordance with the value of N. In the preferred embodiment values, N is broken into three regions, $127 \geq N \geq 8$, wherein $P_{MAX}$ and $P_{MIN}$ are equal to a first set of values, $7 \geq N \geq 2$, wherein $P_{MAX}$ and $P_{MIN}$ are equal to a second set of values, and $N=1$ wherein $P_{MAX}$ and $P_{MIN}$ are equal to a third set of values. The respective values of $P_{MIN}$ and $P_{MAX}$ are chosen generally in accordance with the frequency ($f$) of the sampling clock used. Finer divisions can be made, if desired, by breaking N down into a larger number of regions. It should be appreciated, by those skilled in the art, that threshold decoder 116 may alternatively comprise a suitable read only memory (ROM) type lookup table.

Reset pulse 178, suitably serves the dual purpose of simultaneously initiating a new period measurement and initiating the conversion of the constructed difference frequency signal into a range measurement. The constructed difference frequency signal is applied, as previously noted, to gate 98, which is enabled for a period of given duration by signals from counter 30. Counter 30 upon reception of timing pulse 178 is cleared and applies a positive output signal to gate 88, until a given number, $k$, of blanking signals BS are thereafter accumulated. The blanking signals, it should be recalled are indicative of half cycles of the modulation frequency $f_m$. The duration of the count in counter 30 is thus equal to $(k/2f_m)$. Thus, gate 98 applies pulses at the reconstructed difference frequency to counter 104 for a period of duration $(k/2f_m)$. Range and frequency in a FM-CW ranging system utilizing a triangular modulation waveform having a peak value of $\Delta F$ and frequency $f_m$ are related, it is recalled in accordance with equation (2). It follows, that, counter 104 accumulates a count equal to $$\left( \frac{4\Delta FK}{C} \right) R.$$

The ranging conversion may be facilitated by choosing $\Delta F$ and $k$ such that $(4\Delta Fk/C)$ is equal to some convenient number, for example 10. Each count in counter 104 is thus indicative of 0.1 meters of range. The accumulated count is then displayed or otherwise suitably utilized by output device 108. It should be appreciated that utilizing the blanking signal to generate the enabling signal of gate 98 compensates for any variation in the modulation frequency $f_m$. As previously noted, the drift in the clock frequency is similarly compensated for. Thus, the accuracy of the range measurement depends solely on the stability of $\Delta F$.

It should be noted that when there is no target present, and hence no return signal, suitable threshold circuitry, not shown, may be utilized to inhibit the processor and activate a suitable no-target indicator.

It will be understood that, while various conductors in the drawing are shown and referred to as single conductors, they may in fact be a plurality of connections between the various elements of the system.

It is apparent from the foregoing description that the present invention provides a particularly advantageous signal processor for use in a continuous wave radar ranging system, in that it eliminates the quantization error that generally arises in conventional systems and provides an override mode of operation to make timely adjustments to the system parameters in the event of abrupt decreases in range between the interrogating unit and the nearest target.

A signal processor according to the present invention has been implemented using RCA COS-MOS logic circuits and has been tested both in the laboratory and in the field. The experimental system used a triangular modulation with $f_m$ equal to 2.2 KHz and $\Delta F$ equal 22MHz. The experimental system used a clock having frequency 2.5MHz. Such a system utilizing the prior art zero crossing processing explained above would produce range measurements quantized in steps of approximately 1.7 meters. Experimental results from a field test of a ranging system utilizing a processor in accordance with the present invention showed that, in practice, range measured therewith is quantized only by the display limitation, in the experimental case, 0.1 meters. Laboratory experiments indicated that the constructed $f_R$ would track the actual $f_R$ within 0.2%. The 0.2% is basically determined by the number of bits in the period counter 68 and is thus not a fundamental limitation on system accuracy, since additional bits can be used if necessary.

It will be understood that the above description is of an illustrative embodiment of the present invention and that the invention is not limited to the specific forms shown. Modifications may be made in the design and arrangement of the elements without departing from the spirit of the invention.

What is claimed is:

1. In a continuous wave radar ranging system, wherein a signal is transmitted in the direction of a target and is reflected from said target back to the source of said transmitted signal, said transmitted signal being frequency modulated in accordance with a given periodic waveform, said ranging system including means for deriving from said transmitted signal and said reflected signal a difference signal indicative of the frequency difference of said reflected signal from the instantaneous frequency of said transmitted signal, a signal processor comprising:
   a. blanking means, receptive of signals indicative of said modulation waveform, for generating a train of blanking pulses in synchronism with the extrema of said modulation waveform, said blanking pulses having a width at least as great as the duration of any phase reversal region in said difference signal;
   b. zero crossing detector means, responsive to said blanking pulses and a signal indicative of a variable number and receptive of said difference signal for generating signals indicative of zero crossings in said difference signal occurring respectively a predetermined number and said variable number of zero crossings after each blanking pulse and said variable number being determined from the last range measurement of said target;
   c. accumulator means, responsive to said predetermined and variable number zero crossing signals, for producing a signal indicative of the cumulative duration of the time periods between the respective occurrence of corresponding predetermined number zero crossings and variable number zero crossings occurring after each of a second predetermined number of blanking pulses;
   d. conversion means, receptive of said duration signal, for deriving from said duration the range of said target and producing a signal indicative of said range; and
   e. override condition detector means, responsive to said blanking pulses and said predetermined and variable number zero crossing signals, for resetting said accumulator means to zero, decreasing said variable number, and initiating a new determination of said cumulative duration when said variable number of zero crossings after any given blanking pulse encompass the next succeeding blanking pulse.

2. The signal processor of claim 1 further including feedback means, receptive of said signal indicative of said cumulative duration for varying said variable number in accordance with said cumulative duration and for generating said signal indicative of said variable number.

3. The signal processor of claim 2, wherein said feedback means comprises:
   a. an up down counter for producing said signals indicative of said variable number; and
   b. comparator means, receptive of said cumulative duration signal and signals indicative of predetermined threshold values, for comparing said duration to said predetermined threshold values and producing control signals to said up down counter in accordance with said comparison for adjusting said variable number.

4. The signal processor of claim 3 wherein said feedback means further comprises:
   threshold means, receptive of said signal indicative of said variable number, for determining said threshold values in accordance with said variable number.

5. The signal processor of claim 1 wherein said override condition detector means comprises:
   a. means, receptive of said blanking pulses, and said predetermined and variable number zero crossing signals, for generating an override gate signals when said variable number zero crossing occurring after a given blanking pulse is preceeded by the next subsequent blanking pulse; and
   b. gate means, receptive of said blanking pulses and responsive to said override gate signal, for generating a reset pulse, synchronous with said subsequent blanking pulse, to effect resetting said accumulator means to zero, decreasing said variable number and initiating a new determination of said cumulative duration.

6. A method of processing signals in a continuous wave radar ranging system wherein a signal is transmitted in the direction of a target and is reflected from said target back to the source of said transmitted signal, said transmitted signal being frequency modulated in accordance with a given periodic waveform, said ranging system including means for deriving from said transmitted signal and said reflected signal a difference signal indicative of the frequency difference of said reflected signal from the instantaneous frequency of said transmitted signal, comprising the steps of:
- a. generating, from a signal indicative of said modulation waveform, a train of blanking pulses in synchronism with the extrema of said modulation waveform, said blanking pulses having a width at least as great as the duration of any phase reversal region in said difference signal;
- b. generating, from said blanking pulses, said difference signal, and a signal indicative of a variable number, signals indicative of zero crossings in said difference signal occurring respectively a predetermined number and said variable number of zero crossings after each blanking pulse;
- c. producing from said predetermined and variable number zero crossing signals, a signal indicative of the cumulative duration of the time periods between the respective occurrence of corresponding predetermined number zero crossings and variable number zero crossings occurring after each of a second predetermined number of blanking pulses;
- d. deriving from said cumulative duration the range of said target and said variable number, and producing a signal indicative of said range and said signal indicative of said variable number;
- e. detecting the condition wherein said variable number zero crossing after any given blanking pulse occurs after the next succeeding blanking pulse; and
- f. in response to detection of said condition, overriding said cumulative duration signal generation step (c), resetting said cumulative duration to zero, decreasing said variable number, and reinitiating said cumulative duration signal generation step (c).

* * * * *